UNITED STATES PATENT OFFICE.

MAX HAMEL, OF TREPTOW, NEAR BERLIN, GERMANY, ASSIGNOR TO NITRITFABRIK AKTIENGESELLSCHAFT, OF CÖPENICK, NEAR BERLIN, GERMANY.

PROCESS FOR THE PREPARATION OF GALLIC ACID.

1,100,730.    Specification of Letters Patent.    Patented June 23, 1914.

No Drawing.    Application filed February 25, 1914.    Serial No. 820,877.

*To all whom it may concern:*

Be it known that I, MAX HAMEL, a citizen of the Empire of Germany, residing at Treptow, near Berlin, Germany, have invented certain new and useful Improvements in Processes for the Preparation of Gallic Acid, of which the following is a specification.

Gallic acid is made from nutgalls by allowing them to ferment in a moist state for some time. The moist product of reaction is extracted by means of ether, alcohol or another dissolving agent. After filtering the solution and driving off the solvent there remains a messy and dirty looking residue, which requires a repeated recrystallization to yield a pure product.

I have found that I can obtain in a much simpler and quicker manner a pure product and a better yield by drying the moist product of reaction mentioned above at an elevated temperature previous to the extraction. The moist product is liable to putrefy quickly and there is unavoidably a loss of gallic acid unless the moist mass be extracted without loss of time when the fermentation process is finished. In practice the immediate extraction with the customary solvents is not always feasible. The decomposition then goes on, accompanied by a loss of gallic acid. That drawback can be radically prevented by drying the moist product of reaction at an elevated temperature, say between 80° and 100° C. until the mass is thoroughly dry. The dried product can be kept for any length of time without undergoing further decomposition.

The same process is also applicable to other known raw-materials for making gallic acid, for instance, to sumac, dividivi, etc.

It is known that stuff capable of fermentation or putrefaction quicker decomposes in a moist state than when dry, but it could not be expected, especially with a view to the process disclosed in German Patent 218534, that by drying after the fermentation is finished or nearly finished just the impurities accompanying the gallic acid which at a later stage cause the messy and black looking appearance of the crystallized gallic acid would undergo such a change that they become insoluble in the solvents, used for the extraction. By drying the moist mass after the fermentation I obtain directly a nearly pure gallic acid which can be readily sold without further purification and only requires one single recrystallization to become a chemically pure preparation.

The invention does therefore not consist in the treatment of the crude nutgalls or in the treatment of the extract, but its essential feature lies in the drying of the moist product from the fermentation of the nutgalls at an elevated temperature previous to the extraction, *i. e.* previous to its treatment with ether, alcohol or other solvents.

As an example, I will describe the process as it is carried out in practice. Nutgalls are fermented in a moist state in a manner well known. After the fermentation is completed, the mass is dried at a temperature of about 90° C. until the mass is thoroughly dry. I can also apply a lower temperature, but in that case the drying will naturally require more time, whereas if a temperature of 120° C be employed for drying, the mass turns dark. After drying the mass is treated with alcohol or ether or a mixture of both solvents. The excess of the solvent is then driven off and I obtain directly a nearly pure product, while the yield is increased by at least 10%, compared with the old process.

Having now described my process and the manner in which it is carried out, what I desire to secure by Letters Patent of the United States is:—

A process for the preparation of gallic acid from fermented nutgalls, sumac and the like consisting in drying the moist fermented mass at an elevated temperature previous to the extraction of gallic acid by solvents in order to convert the impurities formed during the fermentation into a state in which they are insoluble in the customary solvents.

In testimony whereof I affix my signature in presence of two witnesses.

MAX HAMEL.

Witnesses:
  WOLDEMAR HAUPT,
  HENRY HASPER.